US008842238B2

(12) United States Patent
Lee et al.

(10) Patent No.: US 8,842,238 B2
(45) Date of Patent: Sep. 23, 2014

(54) BACKLIGHT UNIT WITH LIGHT GUIDE PLATE HAVING A PLURALITY OF AIR BARRIERS AND LIQUID CRYSTAL DISPLAY DEVICE HAVING THE SAME

(75) Inventors: Hee Kyung Lee, Paju-si (KR); Byoung Ku Kim, Goyang-si (KR); Jun Ho Bae, Paju-si (KR); Yong Ik Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 539 days.

(21) Appl. No.: 12/950,571

(22) Filed: Nov. 19, 2010

(65) Prior Publication Data

US 2011/0141401 A1 Jun. 16, 2011

(30) Foreign Application Priority Data

Dec. 11, 2009 (KR) .................. 10-2009-0123566

(51) Int. Cl.
*G02F 1/1335* (2006.01)
*F21V 7/04* (2006.01)
*F21V 8/00* (2006.01)

(52) U.S. Cl.
CPC ............ *G02B 6/0011* (2013.01); *G02B 6/0078* (2013.01)
USPC ................... 349/62; 349/61; 349/63; 349/65; 362/606; 362/610; 362/611; 362/612; 362/615

(58) Field of Classification Search
USPC ...................... 349/61–65; 361/612; 362/606, 362/610–612, 615
See application file for complete search history.

(56) References Cited

U.S. PATENT DOCUMENTS

| | | | |
|---|---|---|---|
| 2004/0130884 A1* | 7/2004 | Yoo et al. ......................... | 362/31 |
| 2006/0139905 A1* | 6/2006 | Kao et al. ......................... | 362/23 |
| 2007/0188677 A1* | 8/2007 | Souk et al. ...................... | 349/65 |
| 2008/0030650 A1* | 2/2008 | Kitagawa et al. ............... | 349/65 |
| 2008/0142435 A1* | 6/2008 | Kawai et al. ................... | 210/501 |
| 2009/0290377 A1* | 11/2009 | Tsai ............................... | 362/616 |
| 2010/0085774 A1* | 4/2010 | Park .............................. | 362/619 |
| 2011/0013421 A1* | 1/2011 | Um ................................ | 362/612 |
| 2011/0164434 A1* | 7/2011 | Derichs ......................... | 362/612 |
| 2012/0020074 A1* | 1/2012 | Sone et al. .................... | 362/231 |

FOREIGN PATENT DOCUMENTS

CN 101097054 A 1/2008

* cited by examiner

*Primary Examiner* — Hoan C Nguyen
(74) *Attorney, Agent, or Firm* — Birch, Stewart, Kolasch & Birch, LLP

(57) ABSTRACT

A backlight unit being scan-driven is discussed. The backlight unit according to an embodiment includes light sources configured to emit light, and a light guide plate disposed parallel to the light sources and configured to convert spotted lights entered from the light sources into two-dimensional light. The light guide plate includes a plurality of air barriers arranged at a fixed interval and configured to guide lights from the light sources in blocks with a width of the fixed interval.

6 Claims, 3 Drawing Sheets

LIGHT INCIDENT PORTION

LIGHT INCIDENT PORTION

BACKLIGHT UNIT WITH LIGHT GUIDE PLATE HAVING A PLURALITY OF AIR BARRIERS AND LIQUID CRYSTAL DISPLAY DEVICE HAVING THE SAME

CROSS-REFERENCE TO RELATED APPLICATION

This application claims priority under 35 U.S.C. §119 to Korean Patent Application No. 10-2009-0123566, filed on Dec. 11, 2009, which is hereby incorporated by reference in its entirety.

BACKGROUND

1. Field of the Disclosure

This disclosure relates to a backlight unit, and more particularly to a backlight unit capable of being scan-driven, as well as a liquid crystal display (LCD) device with the same.

2. Description of the Related Art

Cathode ray tubes (CRTs) correspond to one of display devices which are widely used. The CRTs are mainly used as monitors for TVs, measuring apparatuses, information terminals, and others. However, the heavy weight and large size of the CRTs have been a major hindrance to the manufacturing of small, light electronic products.

In other words, the CRTs have the limitations of weight and size in the current trend of small, light electronic products. Under such circumstances, LCD devices using an electro-optical effect, plasma display panels (PDPs) using a gas discharge, electro luminescence display (ELD) devices using an electro-luminescent effect, and so on are expected to substitute for the CRTs.

Among the substitutable display devices, LCD devices are being actively researched. Also, LCD devices are gradually being used in a wide range of applications due to their advantages such as lightness, thinness, and low power consumption. Moreover, LCD devices are being manufactured to have even larger screens, be thinner, and consume less power, in order to meet the requirements of users. Such LCD devices display images by controlling the amount of light transmitted through liquid crystal.

LCD devices are not self-illuminating display devices, unlike CRTs. As such, an LCD device includes a backlight unit provided on the rear surface of an LCD panel. The backlight unit includes a separated light source providing light necessary to display an image. The backlight unit can be classified as either an edge type or a direct type in accordance with the disposition of a light source.

Such an edge type backlight unit is mainly applied to comparatively small-sized LCD devices such as the monitors of laptops and desk-top computers. The edge type backlight unit has good light uniformity, a lengthened lifespan, and the advantage of making the LCD device thinner.

The direct type backlight unit has begun to be concentrically developed as the LCD device is enlarged to a size above 20 inches. The direct type backlight unit forces light to be directly irradiated onto the entire surface of the LCD panel. To this end, the direct type backlight unit includes a plurality of light sources arranged on the lower surface of a diffusion plate. Since the direct type backlight unit has a higher light efficiency than the edge type backlight unit, it is mainly used for LCD devices of a large size which require a high brightness.

The backlight unit employs a plasma type light source, such as a cold cathode fluorescent lamp (CCFL), a hot cathode fluorescent lamp (HCFL), an external electrode fluorescent lamp (EEFL), an external and internal electrode fluorescent lamp (EIFL), or others, as a light source. Alternatively, the backlight unit uses a light emission diode (LED) as a light source. Particularly, the LED is widely used in the backlight unit because of its features of long lifespan, low power consumption, small size, superior durability, and others.

The edge type backlight unit ordinarily includes a plurality of LEDs arranged on its side surface, and a light guide plate disposed parallel to the plurality of LEDs. Recently, the edge type backlight unit is being configured to be driven in a scan mode, in order to prevent the generation of a residual image. This scan mode backlight unit divides a screen (for example, an LCD panel) into a plurality of blocks arranged along a direction and sequentially applies light to the blocks.

To this end, the ordinary backlight unit of the scan mode forces the plurality of LEDs positioned at its one side to be sequentially lightened in a fixed-size division. Also, the ordinary backlight unit guides light emitted from the plurality of LEDs to the divided blocks on the LCD panel using the light guide plate. However, emitted light from the LEDs is diffusively reflected when it enters the light guide plate. Due to this, it is very difficult for the backlight unit to drive in the scan mode.

On the other hand, a light guide plate with guide patterns formed on its upper and lower surfaces is being used in the ordinary LCD device, in order to guide light to each of the divided blocks. It is also difficult for the patterned light guide plate to prevent the diffused refection of light.

BRIEF SUMMARY

Accordingly, the present embodiments are directed to an LCD device that substantially obviates one or more of problems due to the limitations and disadvantages of the related art.

An object of the present embodiment is to provide a backlight unit capable of being scan-driven, and an LCD device with the same.

Additional features and advantages of the embodiments will be set forth in the description which follows, and in part will be apparent from the description, or may be learned by practice of the embodiments. The advantages of the embodiments will be realized and attained by the structure particularly pointed out in the written description and claims hereof as well as the appended drawings.

According to one general aspect of the present embodiment, a backlight unit includes a light source configured to emit light, and a light guide plate disposed parallel to the light sources and configured to convert spotted lights entered from the light sources into two-dimensional light. The light guide plate includes a plurality of air barriers arranged at a fixed interval and configured to guide lights from the light source in blocks with a width of the fixed interval.

An LCD device according to another aspect of the present embodiment includes a liquid crystal display panel, a light sources disposed by on under side of the liquid crystal display panel and configured to emit light, and a light guide plate disposed parallel to the light sources and configured to convert spotted lights entered from the light sources into two-dimensional light. The light guide plate includes a plurality of air barriers arranged at a fixed interval and configured to guide lights from the light source in blocks with a width of the fixed interval.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION

Figure 1:
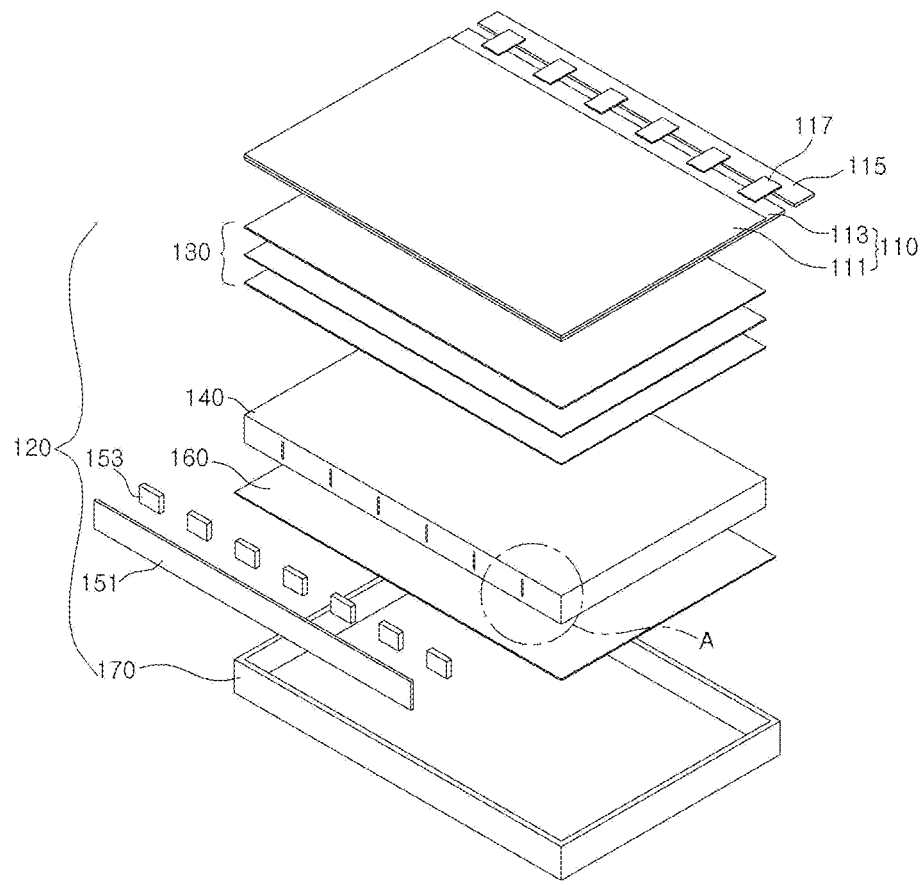
FIG. 1 is a disassembled perspective view showing an LCD device according to an embodiment of the present invention.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
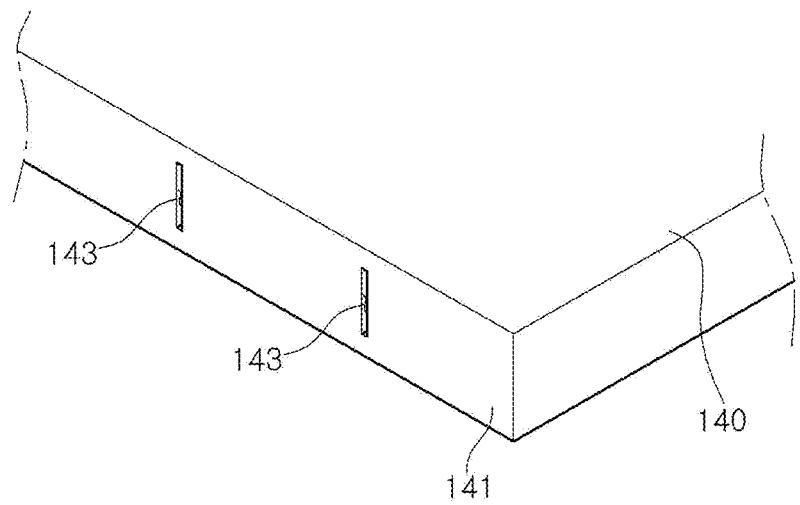
FIG. 2 is a perspective view largely showing a part "A" of the light guide plate in FIG. 1.
Figure 3:
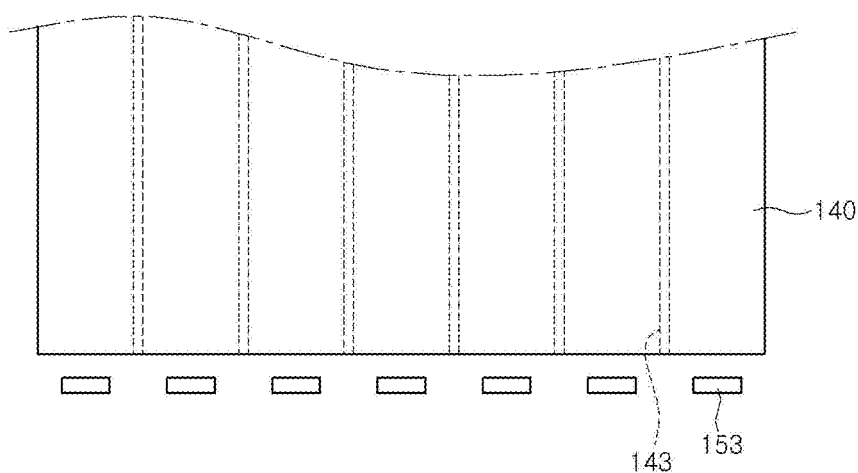
FIG. 3 is a planar view showing the configuration of LEDs and light guide plate in FIG. 1.

FIG. 1 is a disassembled perspective view showing an LCD device according to an embodiment of the present disclosure. FIG. 2 is a perspective view largely showing a part "A" of the light guide plate in FIG. 1. FIG. 3 is a planar view showing the configuration of LEDs and light guide plate in FIG. 1.

Referring to FIGS. 1 through 3, an LCD device according to an embodiment of the present disclosure includes an LCD panel 110 configured to display images, and a backlight unit 120 disposed under the LCD panel 110. The backlight unit 120 applies light to the LCD panel 110.

The LCD panel 110 includes a color filter substrate 111 and a thin film transistor substrate 113 disposed opposite each other and combined to maintain a uniform cell gap between them. The LCD panel 110 further includes a liquid crystal layer (not shown) interposed between the two substrates.

Although they are not shown in detail in the drawings, the color filter substrate 111 and the thin film transistor substrate 113 will now be described in detail. The thin film transistor substrate 113 includes a plurality of gate lines and a plurality of data lines formed to cross each other, and thin film transistors formed at the intersections of the plurality of gate lines and the plurality of data lines. The plurality of gate lines and the plurality of data lines crossing each other define the pixels. The thin film transistors are connected to pixel electrodes each included in the pixels, respectively. On the other hand, the color filter substrate 111 includes: red, green, and blue color filters opposite to the pixels; a black matrix configured to rim each of the color filters; and a common electrode formed to cover the color filters and the black matrix. The black matrix is formed to shield the gate lines, the data lines, and the thin film transistors.

The LCD device further includes a driver printed-circuit-board (PCB) 115 disposed by an edge of the LCD panel 110. The driver PCB 115 applies driving signals to the gate and data lines on the LCD panel 110. To this end, the driver PCB 115 is electrically connected to the LCD panel 110 by means of COFs (chip on films) 117. The COFs 117 can be replaced with tape carrier packages (TCPs).

The backlight unit 120 disposed under the LCD panel 110 includes a box-shaped bottom cover 170 with an opened upper surface, a PCB 151 disposed at an inner side of the bottom cover 170, and a plurality of white LEDs 153 loaded on the PCB 151. The backlight unit 120 further includes a light guide plate 140 disposed parallel to the plurality of white LEDs 153 and configured to convert spotted incident lights into two-dimensional light, a reflection sheet 160 disposed under the light guide plate 140 and configure to reflect light progressing downwardly from the light guide plate 140 toward the LCD panel 110, and optical sheets 130 disposed over the light guide plate 140 and configured to scatter and converge incident light from the light guide plate 140.

Although it is not shown in the drawings, the backlight unit 120 still further includes a support main formed from a mold material in a rectangular rim shape. The support main is configured to receive the PCB 151, white LEDs 153, light guide plate 140, optical sheets 130, and reflection sheet 160. Also, the support main is combined with the bottom cover 170.

The optical sheet 130 includes a diffusion sheet, a converging sheet, and a protective sheet. The diffusion sheet is configured to scatter light. The converging sheet is configured to converge the scattered light. The protective sheet is used to protect a converging pattern formed on the converging sheet.

The PCB 151 is configured to prevent defects which can be caused by heat generated in the white LEDs 153. To this end, the PCB 151 is formed from a superior thermal conductivity metal material suitable to rapidly radiate heat. The white LEDs 153 can be configured in one of a surface mounted type (SMT) and a chip on board (COB).

The light guide plate 140 is formed from poly methyl methacrylate (PMMA). Also, the light guide plate 140 includes a plurality of air barriers 143 separated from one another.

The plurality of air barriers 143 are formed in a slit shape which extends from one side surface of the light guide plate 140 to the other opposite surface. The plurality of air barriers 143 are used to guide incident light from one surface of the light guide plate 140 to the other opposite surface. In other words, the plurality of air barriers 143 improve the direction of light. This results from the fact that the plurality of air barriers 143 reflect incident light entering an incident surface of the light guide plate 140 because of their refractive index different from that of a material of the light guide plate 140. Each of the air barriers 143 is formed on the incident surface 141 opposite to a region between the adjacent LEDs 153.

This disclosure is described to embody the plurality of LEDs 153 arranged on only one side surface of the light guide plate 140, but it is not limited to this. Alternatively, the backlight unit can include pluralities of LEDs arranged on at least two side surfaces of the light guide plate 140.

A number of air barriers 143 can be varied along that of LEDs because they are arranged opposite the separated intervals between the LEDs. Also, a separated distance between the adjacent air barriers 143 can be varied along the size of the LED 153. Therefore, the number of air barriers 143 and the distance between the air barriers 143 depend on the number of LEDs 153 and the separated intervals between the LEDs 153. The light guide plate 140 with such air barriers 143 can be manufactured by an extrusion process using an air pressure force.

In this manner, the light guide plate 140 included in the present disclosure is provided with the plurality of air barriers 143 which are formed to extend from one side surface to the other opposite side surface. As such, the light guide plate 140 can divisionally guide light emitted from the plurality of LEDs 153 by blocks using the plurality of air barriers 143. Accordingly, the light guide plate 140 can prevent the diffused reflection of light when the backlight unit is driven in the scan mode.

In other words, the plurality of air barriers 143 formed in the light guide plate 140 improve the direction of light by refracting light. Therefore, the reliability of the edge type backlight unit configured to be driven in the scan mode can be improved.

Figure 4:
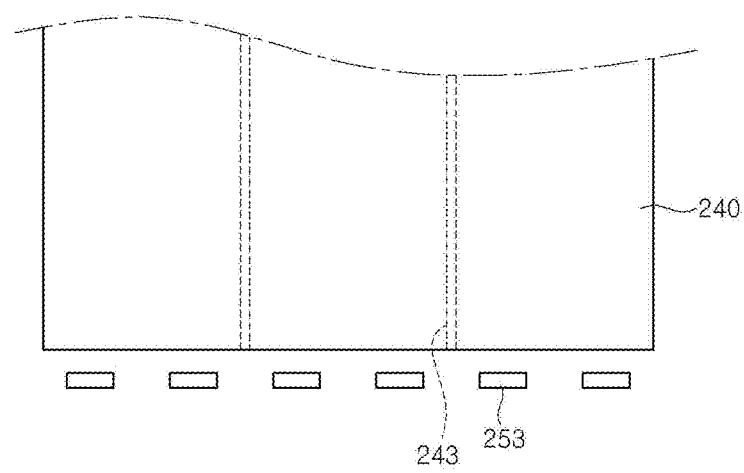
FIG. 4 is a planar view showing the configuration of LEDs and light guide plate according to another embodiment of the present invention.
Figure 5:
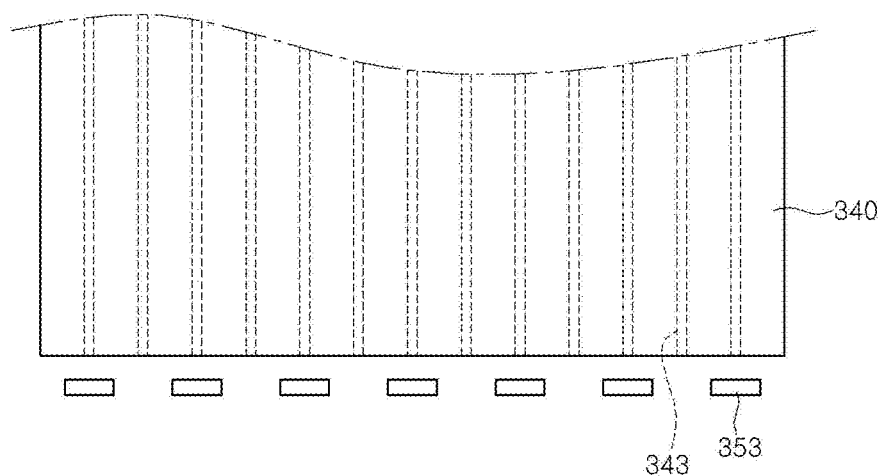
FIG. 5 is a planar view showing the configuration of LEDs and light guide plate according to still another embodiment of the present invention.

FIG. 4 is a planar view showing the configuration of LEDs and light guide plate according to another embodiment of the present disclosure. FIG. 5 is a planar view showing the configuration of LEDs and light guide plate according to still another embodiment of the present disclosure.

As shown in FIG. 4, a light guide plate 240 according to another embodiment includes a plurality of air barriers 243 arranged at a longer interval than that between those of the light guide plate 240 according to the first embodiment. More specifically, a plurality of LEDs 253 are arranged oppositely in twos into each of the regions between the air barriers 240. The interval between the air barriers 243 formed in the light guide plates 240 shown in FIG. 4 can be adjusted according to the size of divided blocks for the scan driving mode of the backlight unit.

A light guide plate 340 according to still another embodiment includes a plurality of air barriers 343 formed opposite of each LED 353 and each region between the LEDs 353, as shown in FIG. 5. In other words, the air barriers 343 in the light guide plate 340 of still another embodiment are more closely arranged to one another in the same direction, than in comparison with those in the light guide plate 140 of the first embodiment. The interval between the air barriers 343 formed in the light guide plates 340 shown in FIG. 5 can be adjusted according to the size of divided blocks for the scan driving mode of the backlight unit.

Figure 6:
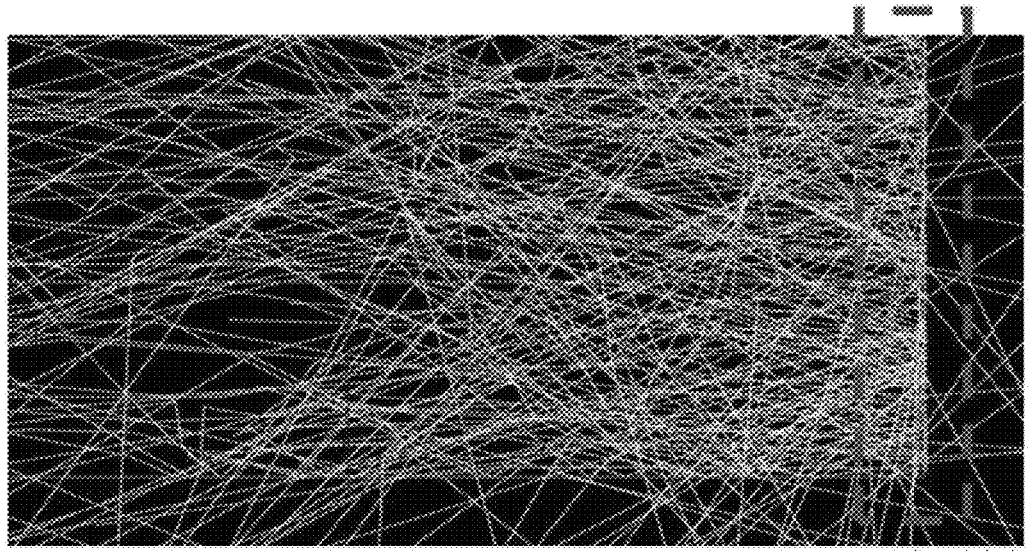
FIG. 6 is a graphical diagram showing light entered to an ordinary light guide plate.
Figure 7:
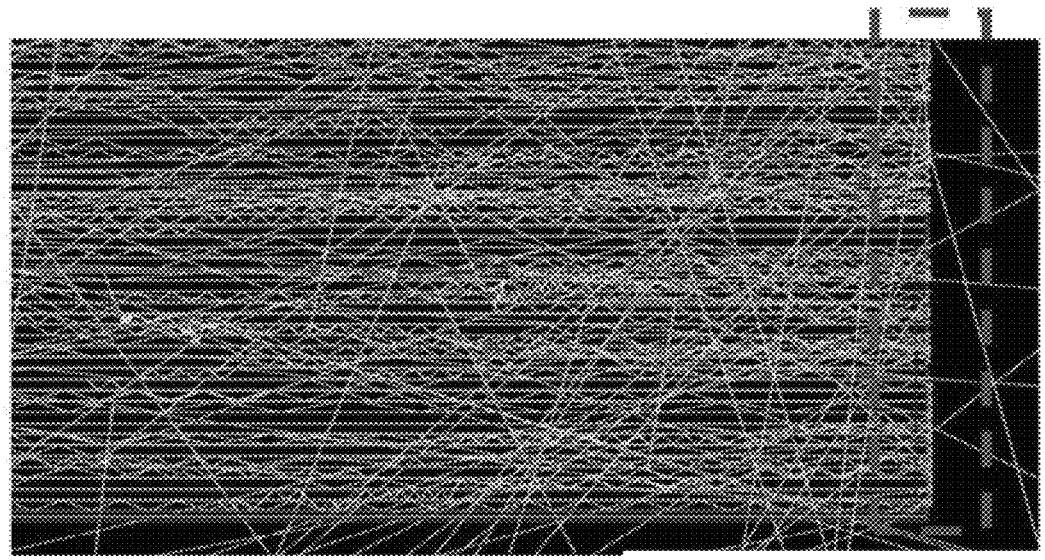
FIG. 7 is an example of a graphical diagram showing light entered to the light guide plate according to embodiments of the present invention.

FIG. 6 is a graphical diagram showing light entered to an ordinary light guide plate. FIG. 7 is a graphical diagram showing light entered to the light guide plate according to embodiments of the present disclosure.

Referring to FIG. 6, the ordinary light guide plate allows light rays emitted from the LEDs to be diffusively reflected at its light incident portion. In a different manner, as seen from FIG. 7, it is evident that light rays entered to the light incident portion of the light guide plate according to the present embodiment are refracted by the plurality of air barriers and progress straightly. In other words, the light guide plate of the present embodiment improves the direction of light and minimizes the diffused reflection of light. Therefore, the light guide plate can divisionally guide light in blocks.

Although the present disclosure has been limitedly explained regarding only the embodiments described above, it should be understood by the ordinary skilled person in the art that the present invention is not limited to these embodiments, but rather that various changes or modifications thereof are possible without departing from the spirit of the present invention. Accordingly, the scope of the present invention shall be determined only by the appended claims and their equivalents.

What is claimed is:

1. A backlight unit comprising:
   light sources configured to emit light; and
   a light guide plate disposed parallel to the light sources and configured to convert spotted lights entered from the light sources into two-dimensional light,
   wherein the light guide plate includes a plurality of air barriers arranged at a fixed interval and configured to guide lights from the light sources in blocks with a width of the fixed interval,
   wherein the plurality of air barriers is formed in a slit shape,
   wherein the plurality of air barriers include a plurality of first air barriers and a plurality of second air barriers,
   wherein the plurality of first air barriers and the plurality of second air barriers are alternately disposed,
   wherein the light sources only correspond to the plurality of first air barriers,
   wherein the whole of upper regions of the light guide plate are connected to each other, and
   wherein the whole of lower regions of the light guide plate are connected to each other.

2. The backlight unit claimed as in claim 1, wherein the plurality of air barriers extend from one side surface of the light guide plate to the other opposite side surface.

3. The backlight unit claimed as in claim 1, wherein a distance between the air barriers depends upon that between the light sources and the number of the light sources.

4. A liquid crystal display device comprising:
   a liquid crystal display panel;
   light sources disposed under a side of the liquid crystal display panel and configured to emit light; and
   a light guide plate disposed parallel to the light sources and configured to convert spotted lights entered from the light sources into two-dimensional light,
   wherein the light guide plate includes a plurality of air barriers arranged at a fixed interval and configured to guide lights from the light sources in blocks with a width of the fixed interval,
   wherein the plurality of air barriers is formed in a slit shape,
   wherein the plurality of air barriers include a plurality of first air barriers and a plurality, of second air barriers,
   wherein the plurality of first air barriers and the plurality of second air barriers are alternately disposed,
   wherein the light sources only correspond to the plurality of first air barriers,
   wherein the whole of upper regions of the light guide plate are connected to each other, and
   wherein the whole of lower regions of the light guide plate are connected to each other.

5. The liquid crystal display device claimed as in claim 4, wherein the plurality of air barriers extend from one side surface of the light guide plate to the other opposite side surface.

6. The liquid crystal display device claimed as in claim 4, wherein a distance between the air barriers depends upon that between the light sources and the number of the light sources.

\* \* \* \* \*